W. H. MAYBACH.
CARPET-STRETCHER.
No. 187,544. Patented Feb. 20, 1877.
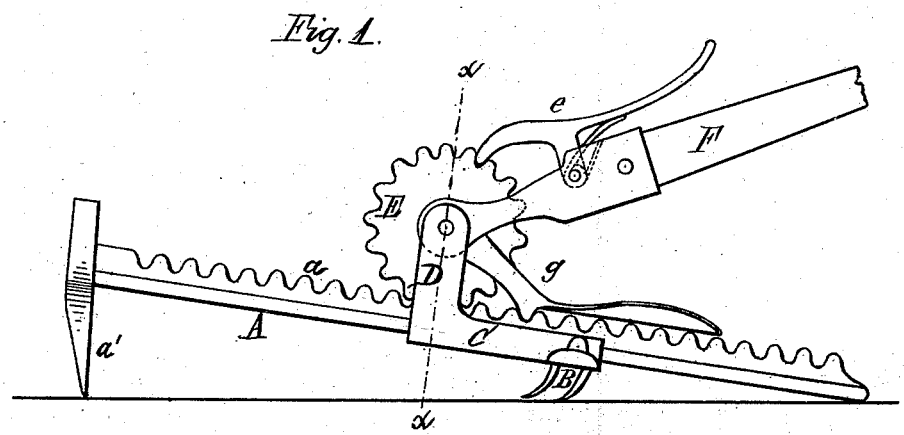
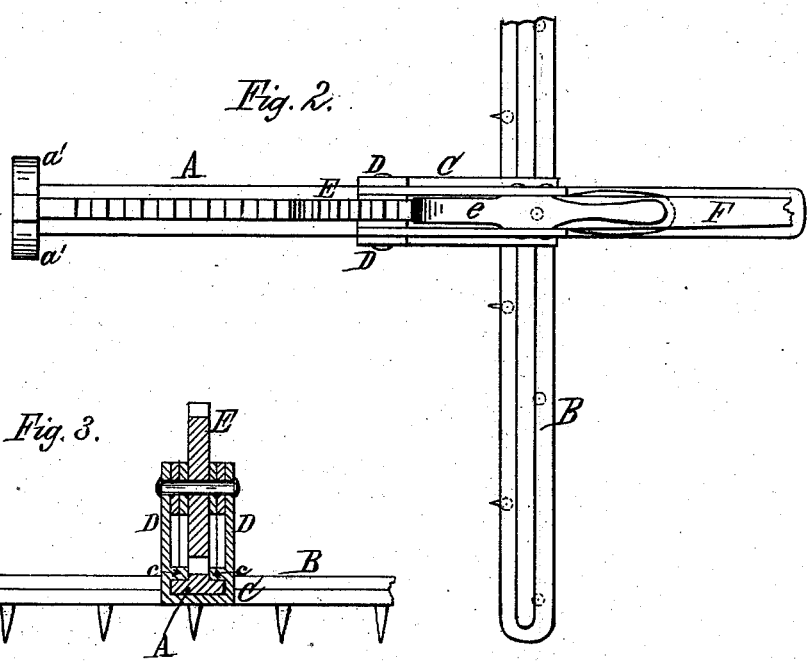

UNITED STATES PATENT OFFICE.

WILLIAM H. MAYBACH, OF BUFFALO, NEW YORK.

IMPROVEMENT IN CARPET-STRETCHERS.

Specification forming part of Letters Patent No. 187,544, dated February 20, 1877; application filed September 15, 1876.

*To all whom it may concern:*

Be it known that I, WILLIAM H. MAYBACH, of the city of Buffalo, in the county of Erie and State of New York, have invented certain new and useful Improvements in Carpet-Stretchers, which improvements are fully set forth in the following specification, reference being had to the accompanying drawing.

My invention relates to a device composed of a rack-bar adapted to be secured to the floor, and a movable cross-bar provided with teeth for taking hold of the carpet, and actuated by a lever and pinion engaging with the rack-bar, as will be hereinafter more fully set forth.

In the accompanying drawing, Figure 1 is a side elevation of my improved carpet-stretcher. Fig. 2 is a top-plan view of the same. Fig. 3 is a cross-section on line $x$ $x$, Fig. 1.

Like letters of reference refer to like parts in each of the figures.

A represents the stationary bar, provided on its upper side with a gear-rack, $a$, and having at one end two prongs, $a'$, which project downwardly, and are adapted to be driven into the floor. B represents the movable bar, arranged transversely with reference to the bar A, and constructed so as to slide on the latter. The bar B is provided with a bearing or guide-piece, C, arranged underneath the bar A, and having lugs or jaws $c$ overlapping the top and sides thereof, as clearly shown in Fig. 3. D represents two standards, formed with the bearing C, and E a gear-wheel pivoted between the upper ends thereof, so as to mesh with the rack $a$. F is a hand-lever swinging on the shaft of the gear-wheel E, and provided with a spring-pawl, $e$, engaging with the wheel E in such manner that, by swinging the lever forward, or toward the fixed end of the bar A, the pawl $e$ will engage with the wheel E, and cause the same to turn in the same direction, while, during the backward movement of the lever F, the pawl $e$ will ride over the teeth of the wheel E without moving the latter. $g$ is a detent-pawl, hung on the shaft of the wheel E, so as to engage with the teeth of the rack-bar A, and prevent the wheel E from moving the bar B backward when the handle is swung backward.

The pawl $g$ is held in engagement with the bar A by its own weight; but, if desired, a suitable spring may be employed for the purpose.

In using my improved device the bar B is first drawn back to the rear end of the bar A, which is readily accomplished by disengaging the pawls $e$ and $g$, respectively, from the wheel E and bar A, when the wheel E is free to be moved on the bar A either forward or backward. The prongs $a'$ of the bar A are then driven into the floor near the base of the wall, and the bar B engaged with the carpet, when, upon releasing the pawls $e$ $g$, and moving the handle F forward, the bar B is moved toward the fixed end of the bar A, thereby drawing the carpet toward the wall. When the forward stroke of the lever F is finished it is swung back, the detent-pawl $g$ retaining the bars A and B in their relative position during this movement of the lever, while during the forward stroke of the lever the pawl $g$ rides over the teeth of the bar A. The lever F is now again swung forward, and this operation is repeated until the carpet is properly stretched, when it is secured in place in a common manner.

The parts of my improved device are readily constructed of cast or malleable iron, and easily secured together; the entire device being very simple, and produced at comparatively small expense.

I am aware of Letters Patent No. 10,143, granted to J. W. Weatherby, October 18, 1853; and No. 137,739, granted to O. Vanorman, April 8, 1873, for improvements in carpet-stretchers; and I make no claim to the devices described and shown therein; but

What I claim as my invention, and desire to secure by Letters Patent, is—

The combination, with the stationary rack-bar A, adapted to be secured to the floor, of the movable cross-bar B, bearing C D, gear-wheel E, lever F, actuating-pawl $e$, and detent-pawl $g$, so that, by operating the lever F, the movable bar B will be drawn toward the fixed end of the bar A, substantially as and for the purpose hereinbefore set forth.

WILLIAM H. MAYBACH.

Witnesses:
 CHARLES J. BUCHHEIT,
 EDWARD WILHELM.